(12) United States Patent
Yanaka et al.

(10) Patent No.: US 7,178,613 B2
(45) Date of Patent: Feb. 20, 2007

(54) VEHICLE OPERATING APPARATUS

(75) Inventors: Akihiro Yanaka, Toyota (JP); Koichi Ikeda, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 162 days.

(21) Appl. No.: 10/514,120

(22) PCT Filed: May 12, 2003

(86) PCT No.: PCT/JP03/05860

§ 371 (c)(1),
(2), (4) Date: Nov. 12, 2004

(87) PCT Pub. No.: WO03/095289

PCT Pub. Date: Nov. 20, 2003

(65) Prior Publication Data

US 2005/0205311 A1    Sep. 22, 2005

(30) Foreign Application Priority Data

May 14, 2002  (JP) .............................. 2002-138230

(51) Int. Cl.
*B62D 1/12* (2006.01)
*B62D 5/00* (2006.01)

(52) U.S. Cl. .................. 180/6.32; 180/402; 180/404; 180/333; 701/41

(58) Field of Classification Search ............... 180/6.32, 180/333, 402, 403, 404, 446; 701/41
See application file for complete search history.

(56) References Cited

U.S. PATENT DOCUMENTS

| 5,086,870 | A |  | 2/1992 | Bolduc |  |
| 5,508,929 | A |  | 4/1996 | Harada |  |
| 6,041,884 | A | * | 3/2000 | Shimizu et al. | 180/443 |
| 6,285,936 | B1 |  | 9/2001 | Bohner et al. |  |
| 6,612,395 | B2 | * | 9/2003 | Moser et al. | 180/446 |
| 6,634,454 | B2 | * | 10/2003 | Sugitani et al. | 180/402 |
| 7,021,416 | B2 | * | 4/2006 | Kapaan et al. | 180/405 |
| 2002/0019690 | A1 |  | 2/2002 | Kurishige et al. |  |
| 2002/0079155 | A1 | * | 6/2002 | Andonian et al. | 180/402 |

FOREIGN PATENT DOCUMENTS

| EP | 1 127 775 A1 | 8/2001 |
| JP | A-61-257368 | 11/1986 |
| JP | A 8-34353 | 2/1996 |

(Continued)

Primary Examiner—Lesley D. Morris
Assistant Examiner—Marc A. Scharich
(74) Attorney, Agent, or Firm—Oliff & Berridge, PLC

(57) ABSTRACT

A vehicle operating apparatus which accelerates, decelerates and steers a vehicle in accordance with the operation of the operating lever is provided with a reaction force generating means which generates a reaction force opposing the operating lever, a current sensor which senses failure of the reaction force, and an electric control apparatus which decreases the responsiveness of driving control to the operating lever when a failure is sensed. A steering control apparatus provides driving control equal to that of the state prior to the sensing of a failure when the operating speed of the operating lever at the time of the failure exceeds a prescribed value. Additionally, at the time of detection of a failure, an electric control apparatus reduces vehicle speed by an engine control apparatus.

10 Claims, 11 Drawing Sheets

| | FOREIGN PATENT DOCUMENTS | | | | |
|----|----|----|----|----|----|
| JP | A 10-226352 | 8/1998 | JP | A 2000-170553 | 6/2000 |
| JP | A-10-258751 | 9/1998 | JP | A 2001-58575 | 3/2001 |
| JP | A 11-192960 | 7/1999 | JP | A 2002-157034 | 5/2002 |
| JP | A-2000-052955 | 2/2000 | JP | A 2002-535192 | 10/2002 |
| JP | A-2000-053015 | 2/2000 | WO | WO 00/43251 | 7/2000 |

* cited by examiner

VEHICLE OPERATING APPARATUS

TECHNICAL FIELD

This invention relates to a vehicle operating apparatus which generates a reaction force opposing an operating member operated by a driver in accordance with the amount of displacement of the operating member and performs driving control of a vehicle.

BACKGROUND ART

From in the past, as disclosed, for example, in Japanese Patent Application Laid-Open (kokai) No. Hei 11-192960, there have been vehicles in which a joy stick is used as an operating member, and steering, braking, and acceleration of the vehicle is carried out by tilting the joy stick to the left and right and forward and backward with respect to the vehicle. In such vehicles, a reaction force generating mechanism is provided which generates a reaction force opposing the joy stick in accordance with the amount of operation of the joy stick, and as a result of the reaction force generated by the reaction force generating mechanism, stable driving operation of the vehicle is carried out by a driver.

However, conventional vehicles have a drawback in that, if a failure (abnormality) develops in which a reaction force opposing the joy stick is no longer generated due to a malfunction or the like of the reaction force generating mechanism, the joy stick is inadvertently moved too much, and it becomes difficult to perform driving operation (acceleration, braking, and steering) of the vehicle.

DISCLOSURE OF THE INVENTION

This invention was made in order to deal with the above-described problem, and its object is to provide a vehicle operating apparatus with which, when a failure occurs in which a reaction force opposing an operating member disappears, driving control of a vehicle corresponding to the amount of displacement of the operating member can be switched to a state in which the responsiveness of the driving control is changed.

In order to achieve the above-described object, a characteristic of a vehicle operating apparatus according to the present invention is that it comprises an operating member operated by a driver, a driving control means for controlling the driving of a vehicle in accordance with displacement of the operating member, a reaction force generating means for generating a reaction force opposing the operating member in accordance with the displacement of the operating member, a failure sensing means for sensing the occurrence of a failure in the reaction force generating means, and a driving control responsiveness changing means for controlling the driving control means so as to decrease the responsiveness of driving control of the vehicle in accordance with the displacement of the operating member when the failure sensing means senses a failure of the reaction force generating means.

With the vehicle operating apparatus according to the present invention which is constituted as described above, in a state in which a reaction force opposing the operating member is being generated in a normal manner, driving control is carried out in accordance with the displacement resulting from the operation of the operating member, and if the failure sensing means senses an abnormality of the reaction generating means, and as a result the control by the driving control responsiveness changing means, the driving control means reduces the responsiveness of the driving control of the vehicle to the displacement of the operating member. Accordingly, even if a reaction force opposing the operating member is no longer generated due to a failure of the reaction generating means and as a result the amount of operation of the operating member by the driver becomes large, the responsiveness of driving control to the displacement of the operating member due to its operation is decreased. Therefore, even if the operating member is operated in an unstable state in which a reaction force is not generated and the amount of operation becomes large, the driving control of the vehicle is changed, and safety is maintained.

Another characteristic of the structure of the vehicle operating apparatus according to the present invention is that the driving control responsiveness changing means changes the responsiveness of driving control of the vehicle in accordance with the displacement of the operating member in accordance with the passage of time from the sensing of a failure by the failure sensing means. For example, the responsiveness of driving control of the vehicle is changed in accordance with the passage of time in such a manner that the responsiveness of driving control to the operation of the operating member decreases immediately after the sensing of a failure in the reaction force generating means, but with the passage of time, the responsiveness approaches a normal state. As a result, as the driver becomes accustomed with the passage of time to the operation of the operating member when the reaction generating means has developed a failure, the responsiveness of driving control can be gradually returned to a normal state. As a result, the operability of the vehicle can be returned to a good condition while maintaining safety.

Another characteristic of the structure of a vehicle operating apparatus according to the present invention is that it comprises an operating member operated by a driver, a driving control means for controlling the driving of a vehicle in accordance with displacement of the operating member from a reference position, a reaction force generating means for generating a reaction force opposing the operating member in accordance with the displacement of the operating member, a failure sensing means for sensing the occurrence of a failure in the reaction force generating means, and a dead band changing means for controlling the driving control means so as to increase the dead band provided in the vicinity of the reference position of the displacement of the operating member with respect to the driving control by the driving control means when the failure sensing means senses a failure of the reaction force generating means.

According to a vehicle operating apparatus having the above-described structure, when the vehicle is traveling, even if the reaction generating means develops a failure and the operating member is greatly displaced by a small operating force, only a small operating force is generated in the vehicle, because the dead band for the displacement of the operating member with respect to driving control by the driving control means is increased. The dead band at this time is set in the vicinity of the reference position (neutral position) of the operating member. Accordingly, when steering, acceleration, and braking of the vehicle are controlled by the operation of the operating member, even if a large displacement of the operating member is produced due to the absence of a reaction force opposing the operating member, the vehicle will be maintained in a state in which it travels straight ahead or close to straight ahead, travel in a state close to a constant speed without acceleration or braking is maintained, and the safety of vehicle operation can be guaranteed. If the driver operates the operating member beyond the dead band, the vehicle will perform turning, acceleration, and braking in accordance with the displacement of the operating member which is operated beyond the dead band. In this case, a prescribed correction is added to the displacement of the operating member so as to reduce the displacement of the operating member, whereby the position of the operating member can be set so as to approach the reference position.

Another characteristic of the structure of the vehicle operating apparatus according to the present invention is that it comprises an operating member operated by a driver, a driving control means for controlling the driving of a vehicle in accordance with displacement of the operating member, a reaction force generating means for generating a reaction force opposing the operating member in accordance with the displacement of the operating member, a failure sensing means for sensing the occurrence of a failure in the reaction force generating means, an operating speed sensing means for sensing the operating speed of the operating member, and a driving control changing means for controlling the driving control means so as to change the driving control of the vehicle in accordance with the displacement of the operating member if the operating speed sensed by the operating speed sensing means is at least a prescribed value when the failure sensing means has sensed a failure of the reaction force generating means.

According to a vehicle operating apparatus having the above-described structure, in the case where the reaction force generating means malfunctions and a reaction force opposing the operating member is not generated, when the operating speed of the operating member sensed by the operating speed sensing means becomes at least a prescribed value, the driving control changing means changes the driving control of the vehicle in accordance with the displacement of the operating member. Accordingly, even if the operating speed of the operating member by the driver becomes rapid due to a reaction force opposing the operating member not being generated, driving control of the vehicle based on the displacement of the operating member by that operation is changed. As a result, abrupt steering, for example, based on operation of the operating member can be suppressed, and the vehicle can be made to travel safely.

In this case, driving control of the vehicle is preferably changed by the driving control changing means in such a manner that the steering angle of the vehicle is maintained for a prescribed length of time at the value immediately after the detection of a failure. As a result, abrupt steering is suppressed, and for a prescribed length of time from when a reaction force is not generated, the vehicle can travel with the steering angle before the sensing of a failure.

Another characteristic of the structure of a vehicle operating apparatus according to the present invention is that it comprises an operating member operated by a driver, a driving control means for controlling the driving of a vehicle in accordance with displacement of the operating member, a reaction force generating means for generating a reaction force opposing the operating member in accordance with the displacement of the operating member, a failure sensing means for sensing the occurrence of a failure in the reaction force generating means, and a vehicle speed changing means for controlling the driving control means so as to reduce the speed of the vehicle when the failure sensing means senses a failure of the reaction force generating means.

With this structure, when a failure of the reaction force generating means occurs and a change in the reaction force opposing the operating member develops, the vehicle speed changing means controls the driving control means and lowers the speed of the vehicle, so safety can be maintained with greater certainty. In addition, in this case, if the vehicle speed sensed by the vehicle speed sensing means is less than or equal to a prescribed value, driving of the vehicle can be controlled in accordance with the displacement of the operating member.

BEST MODE FOR CARRYING OUT THE INVENTION

Figure 1:
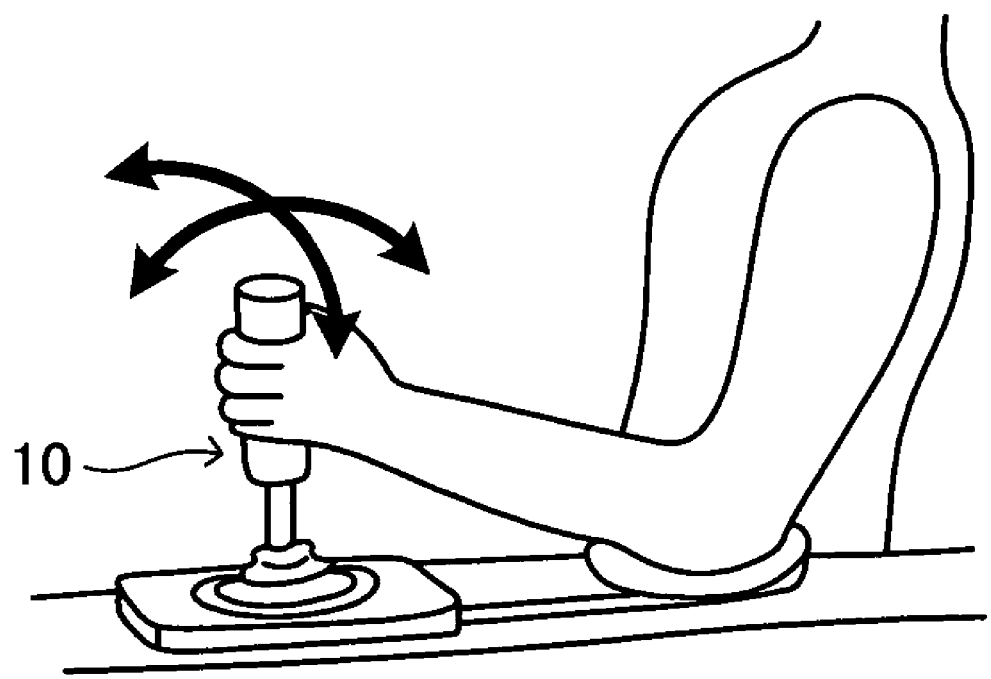
FIG. 1 is a schematic diagram of an operating lever provided in a vehicle operating apparatus according to an embodiment of the present invention.

An embodiment of a vehicle operating apparatus according to the present invention will now be explained while referring to the drawings. This vehicle operating apparatus has the operating lever (joy stick) 10 shown in FIG. 1 as an operating member. The operating lever 10 is provided in the vicinity of the driver's seat in a console box of a vehicle. As shown by the arrows in FIG. 1, it is tilted by the driver backwards and forwards and to the left and right.

Figure 2:
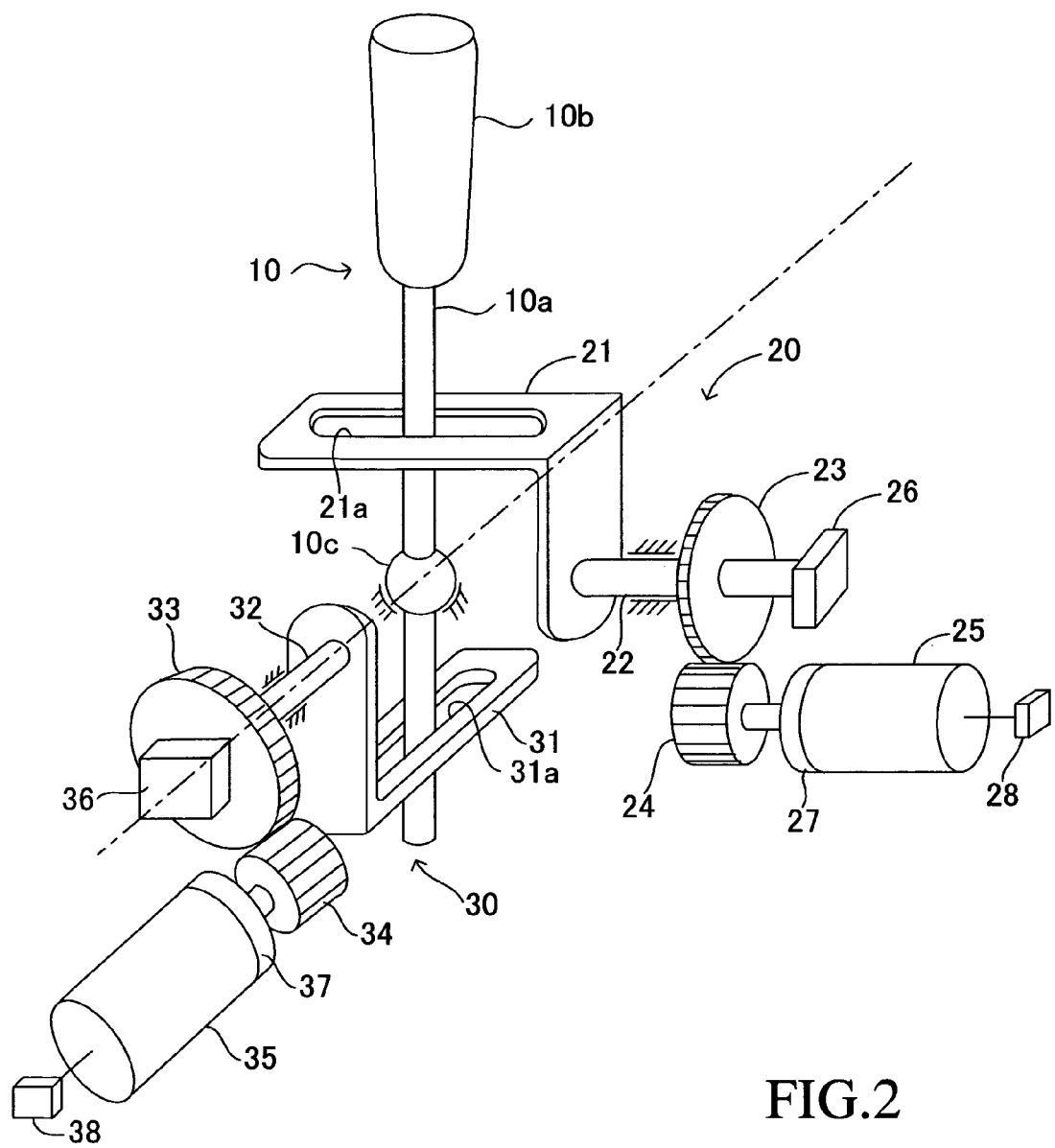
FIG. 2 is a schematic perspective view of an operating lever apparatus including the operating lever shown in FIG. 1.

FIG. 2 is a schematic perspective view of an operating lever apparatus including the operating lever 10. The operating lever 10 includes a cylindrical rod-shaped rod 10*a* and a cylindrical grip 10*b* which is secured to the outer periphery of the upper end of the rod 10*a*. The rod 10*a* has a spherical portion 10*c* at approximately its center. The rod 10*a* is supported via the spherical portion 10*c* so as to be able to rotate to the left and right and forwards and backwards with respect to the vehicle body.

The operating lever apparatus includes a left-right reaction force generating mechanism 20 which generates a reaction force opposing rotation of the operating lever 10 in the left and right direction of the vehicle (a force opposing an operating force by the driver which attempts to rotate it to the left or right of the vehicle from a neutral position) when the vehicle is moving. The left-right reaction force generating mechanism 20 includes a guide plate 21, a rotating shaft 22, a first gear 23, a second gear 24, an electric motor 25 for generating a left-right reaction force, a displacement sensor 26, an encoder 27, and a current sensor 28.

The guide plate 21 comprises a plate-shaped member which is bent into the shape of an L. A surface which is secured to the rotating shaft 22 is disposed so as to be a vertical surface. A groove 21a which has a width somewhat larger than the diameter of the rod 10a and which is elongated in the fore and aft directions of the vehicle is provided in the horizontally-disposed surface. The rod 10a passes through this groove 21a. The rotating shaft 22 is rotatably supported with respect to the vehicle so that its axis extends in the fore and aft directions of the vehicle and passes through the center of the spherical portion 10c of the operating lever 10. The first gear 23 is integrally mounted at its center. The first gear 23 meshes with a second gear 24 which is secured to the rotating shaft of the electric motor 25.

In this manner, the operating lever 10 is supported so as to be able to rotate to the left and right with respect to the vehicle body, and due to the driving of the electric motor 25, the guide plate 21 rotates around the rotating shaft 22, and as a result, it rotates to the left and right. The displacement sensor 26 is secured to the vehicle body at the end of the rotating shaft 22. It senses the rotational angle of the rotating shaft 22 as the amount of displacement to the left and right of the operating lever 10. The value of the rotational angle (displacement) Xa output by the displacement sensor 26 is adjusted in such a manner that when the operating lever 10 is in the neutral position (reference position) to the left and right, the value becomes 0, and when the operating lever 10 is displaced to the left or right from the neutral position, it becomes a positive or negative value whose absolute value is proportional to the amount of displacement from the neutral position.

The encoder 27 used for rotational control of the electric motor 25 is incorporated into the electric motor 25. The encoder 27 senses the rotation of the rotating shaft of the electric motor 25 and outputs a rotation signal indicating the rotation of the rotating shaft. The current sensor 28 which senses the drive current of the electric motor 25 is connected to the electric motor 25.

The operating lever apparatus also includes a fore and aft reaction force generating mechanism 30 which generates a reaction force opposing tilting of the operating lever 10 in the fore and aft directions of the vehicle (a force opposing an operating force by the driver attempting to tilt it from a neutral position in the fore and aft directions of the vehicle). This fore and aft reaction force generating mechanism 30 includes a guide plate 31, a rotating shaft 32, a third gear 33, a fourth gear 34, an electric motor 35 for generating a fore and aft reaction force, a displacement sensor 36, an encoder 37, and a current sensor 38.

The guide plate 31 is a plate-shaped member which is bent into the shape of an L. A surface which is secured to the rotating shaft 32 is disposed so as to be vertical, and a groove 31a having a width somewhat larger than the diameter of the rod 10a and extending in the left and right direction of the vehicle is provided in the surface which is horizontally disposed. The rod 10a passes through this groove 31a. The rotating shaft 32 is rotatably supported such that its axis extends in the left and right direction of the vehicle and passes through the center of the spherical portion 10c of the operating lever 10. The third gear 33 is integrally mounted at its center. The third gear 33 meshes with the fourth gear 34 which is secured to the rotating shaft of the electric motor 35.

In this manner, the operating lever 10 is supported so as to be able to rotate in the fore and aft directions of the vehicle, and due to the driving of electric motor 35, the guide plate 31 rotates around the rotating shaft 32, and as a result it rotates in the fore and aft directions. Displacement sensor 36 is secured to the vehicle body at the end of the rotating shaft 32. It senses the rotational angle of the rotating shaft 32 as displacement in the fore and aft directions of the operating lever 10. The value of the rotational angle (displacement) Ya which is output by displacement sensor 36 is adjusted in such a manner that when the operating lever 10 is in a neutral position (reference position) in the fore and aft directions, the value becomes 0, and when the operating lever 10 is displaced in the fore and aft directions from the neutral position, it becomes a positive or negative value whose absolute value is proportional to the displacement from the neutral position.

The encoder 37 used for rotational control of electric motor 35 is incorporated into electric motor 35. The encoder 37 senses the rotation of the rotating shaft of electric motor 35 and outputs a rotation signal indicating the rotation of the rotating shaft. The current sensor 38 for sensing the drive current of electric motor 35 is connected to electric motor 35. A reaction force generating means according to the present invention is comprised by the left-right reaction force generating mechanism 20 and the fore and aft reaction force generating mechanism 30.

Figure 3:
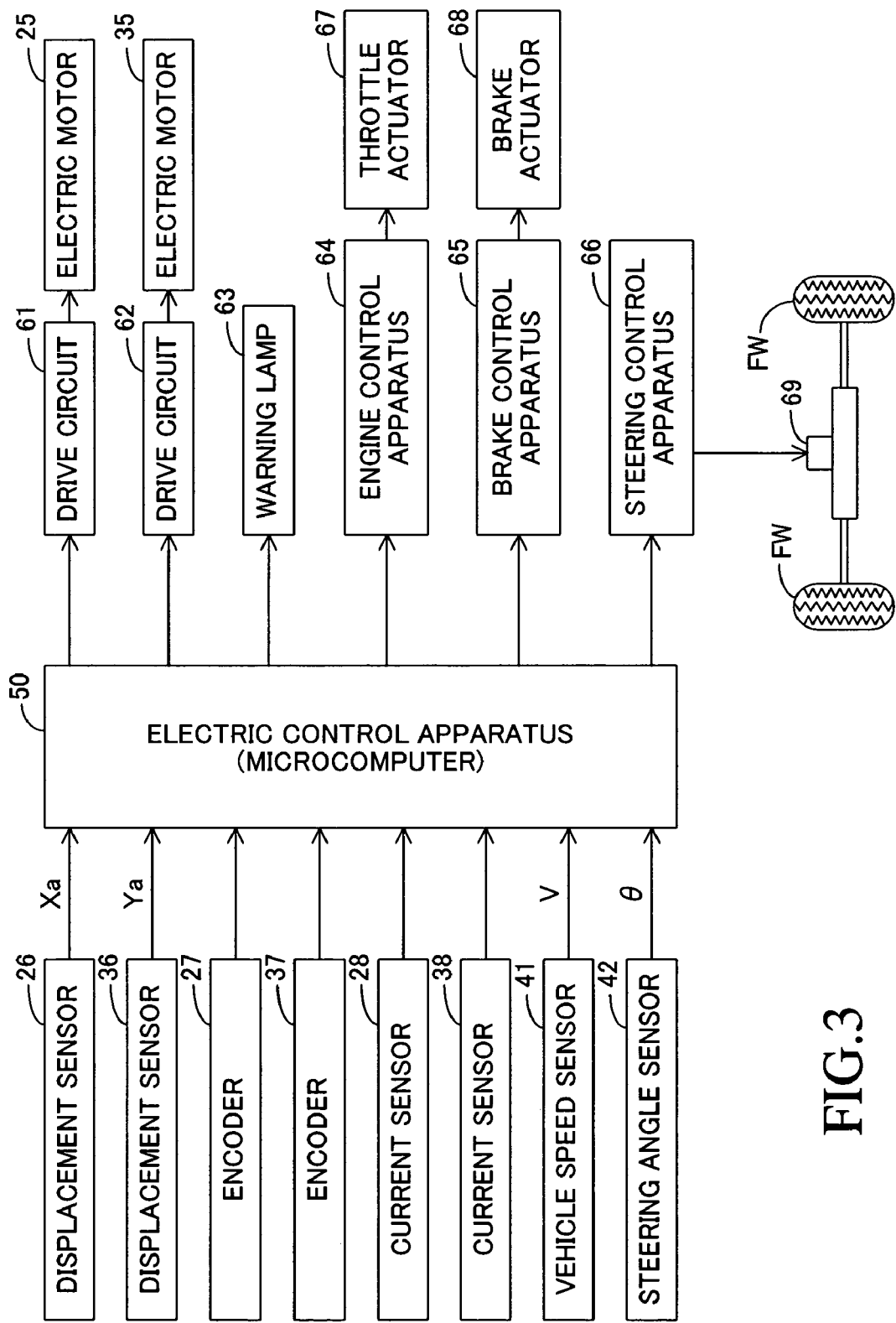
FIG. 3 is a block diagram of an electric control portion of a vehicle operating apparatus according to the embodiment of the present invention.

Next, the electric control portion of the vehicle operating apparatus will be explained with reference to FIG. 3. In addition to the above-described displacement sensors 26 and 36, the encoders 27 and 37, and the current sensors 28 and 38, this electric control portion includes a vehicle speed sensor 41 and a steering angle sensor 42. The vehicle speed sensor 41 senses the vehicle speed V and outputs a detected signal. The steering angle sensor 42 senses the actual steering angle θ of the left and right wheels FW, FW for steering and outputs a detected signal. The actual steering angle θ is 0 when the left and right wheels FW, FW are in a neutral position.

The displacement sensors 26 and 36, the encoders 27 and 37, the current sensors 28 and 38, the vehicle speed sensor 41, and the steering angle sensor 42 are connected to the electric control apparatus 50. The electric control apparatus 50 is constituted by a microcomputer including a CPU, a ROM, a RAM, timers, and the like. It executes a first operating system control (steering control) program shown in FIG. 4 and a second operating system control (acceleration and braking control) program shown in FIG. 5.

The electric control apparatus 50 receives the signals from each of sensors 26, 36, 28, 38, 41, and 42 and from the encoders 27 and 37 as inputs and controls drive circuits 61 and 62, a warning lamp 63, an engine control apparatus 64, a brake control apparatus 65, and a steering control apparatus 66.

Drive circuit 61 performs drive control of electric motor 25 of the left-right reaction force generating mechanism 20 based on the rotational angle Xa of the operating lever 10 which is detected by displacement sensor 26. Drive circuit 62 performs drive control of electric motor 35 of the fore and aft reaction force generating mechanism 30 based on the rotational angle Ya of the operating lever 10 which is detected by displacement sensor 36. The warning lamp 63 is for generating a warning of an abnormality of the encoders 27 and 37 or the current sensors 28 and 38. It lights up when an abnormality occurs in the detected values thereof.

Figure 7:
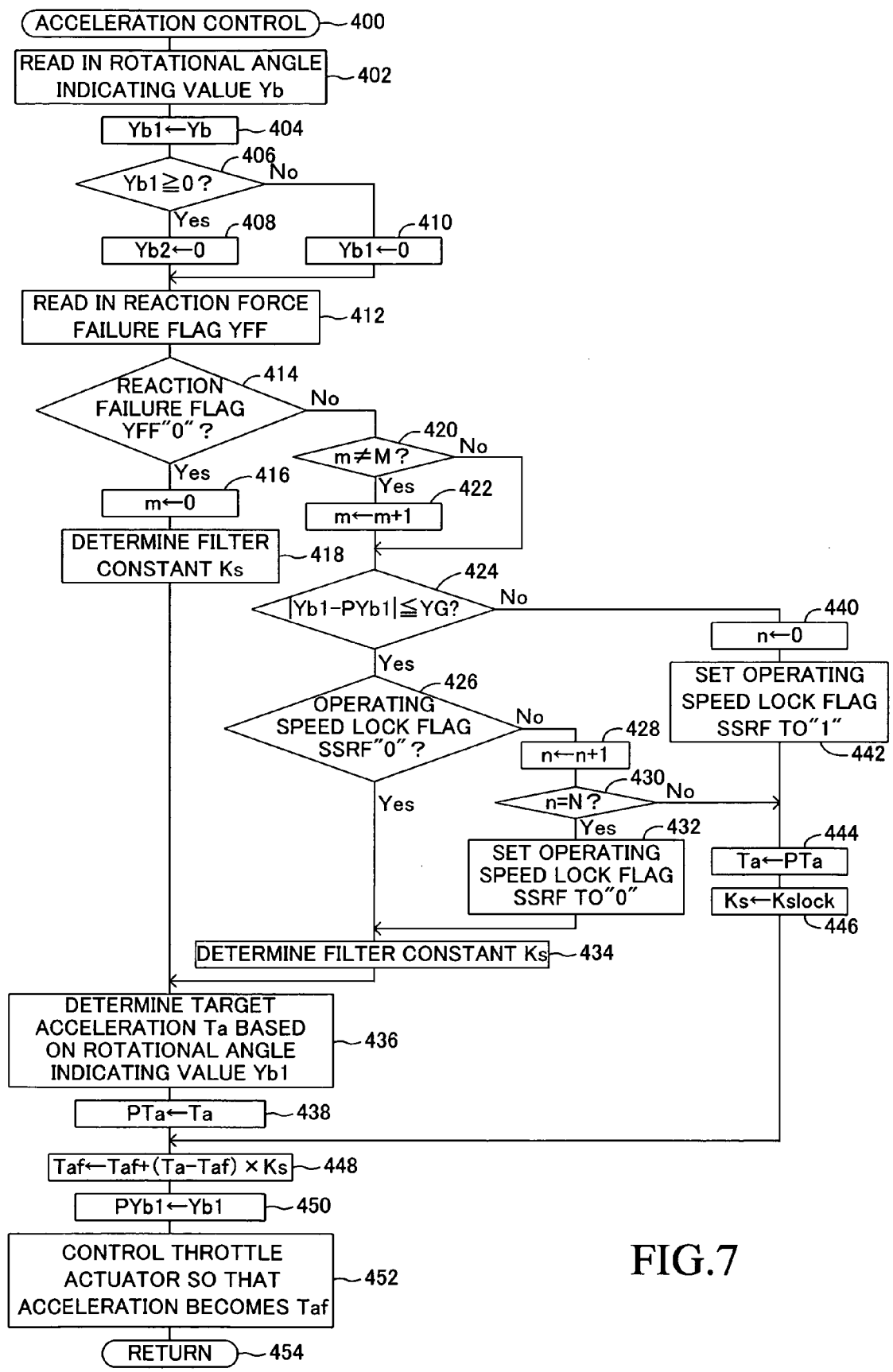
FIG. 7 is a flow chart showing an acceleration control program executed by the engine control apparatus shown in FIG. 3.

The engine control apparatus 64 executes an acceleration control program shown in FIG. 7, and based on the rotational angle Ya of the operating lever 10 which is detected by displacement sensor 36, it controls acceleration of the vehicle by driving the throttle actuator 67 which controls the throttle opening. Taking the neutral position in the fore and aft directions of the vehicle as a border, the acceleration of the vehicle is increased as the operating lever 10 is displaced to the rearward direction thereof, the acceleration of the vehicle is decreased as it is displaced towards the neutral position, and the acceleration is set to 0 at the neutral position.

Figure 8:
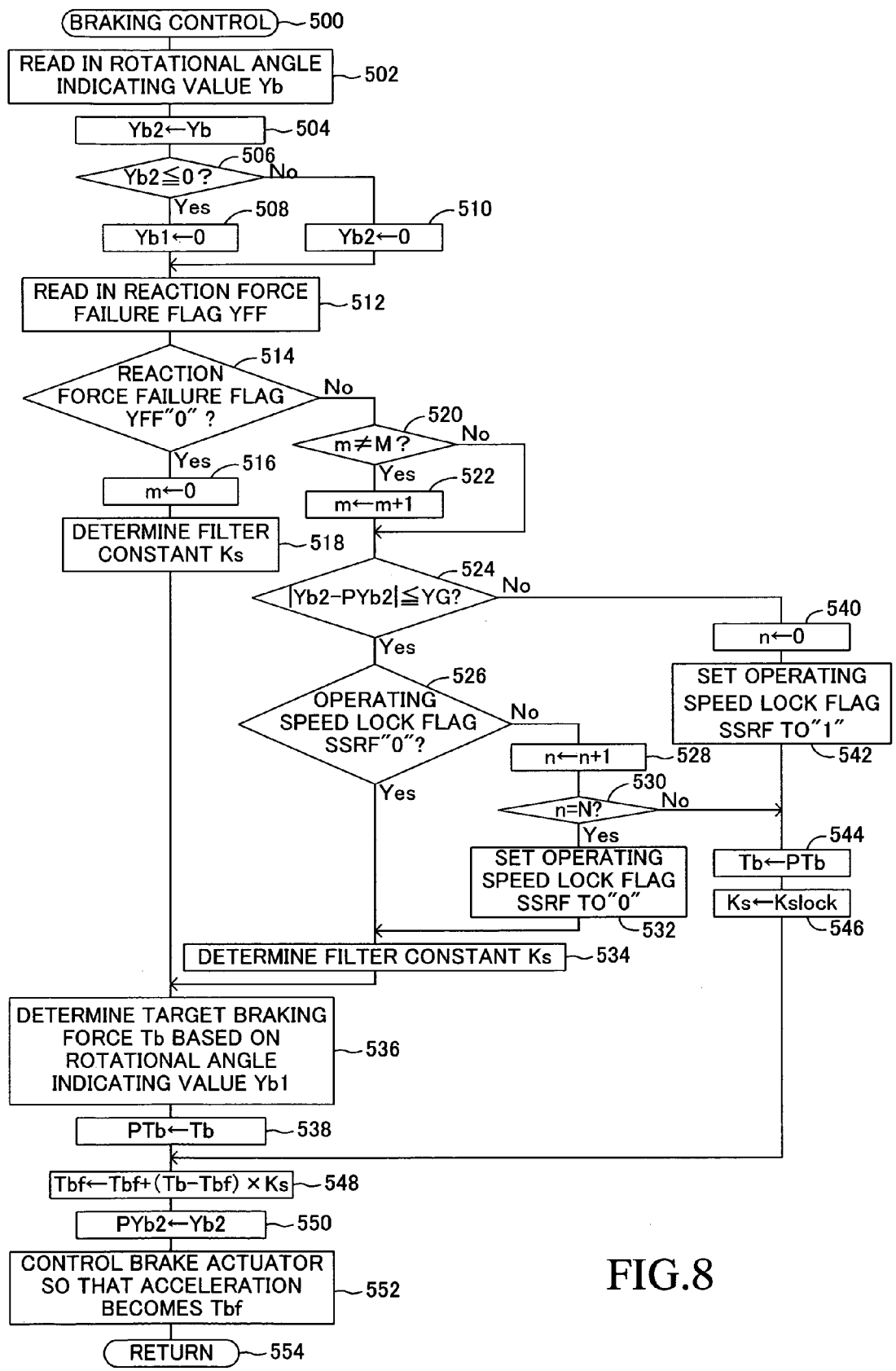
FIG. 8 is a flow chart showing a braking control program executed by the brake control apparatus shown in FIG. 3.

The brake control apparatus 65 executes the braking control program shown in FIG. 8. Based on the rotational angle Ya of the operating lever 10 sensed by displacement sensor 36, it performs braking control on the vehicle by driving a brake actuator 68 which imparts a braking force to the vehicle. Taking the neutral position in the fore and aft directions of the vehicle as a border, the braking force of the vehicle is increased as the operating lever 10 is displaced to the forward direction thereof, the braking force of the vehicle is decreased as it is displaced towards the neutral position, and the braking force is set to 0 at the neutral position.

Figure 6:
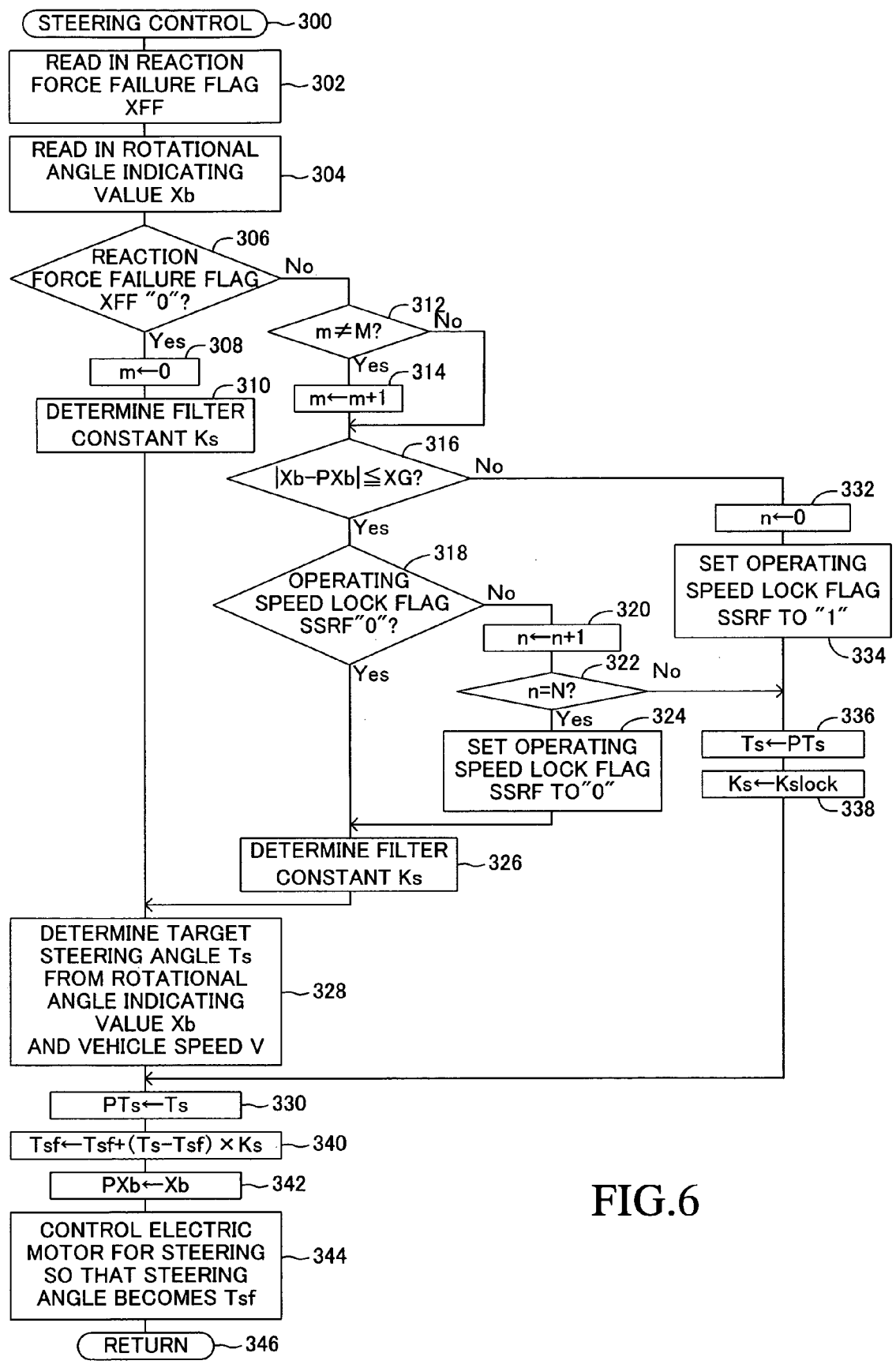
FIG. 6 is a flow chart showing a steering control program executed by the steering control apparatus shown in FIG. 3.

The steering control apparatus 66 executes the steering control program shown in FIG. 6, and based on the rotational angle Xa of the operating lever 10 which is detected by displacement sensor 26, it steers the vehicle to the left and right by controlling an electric motor 69 which is an actuator for steering the left and right wheels FW, FW. Taking the neutral position in the left and right direction of the vehicle as a border, when the operating lever 10 is displaced towards the righthand side of the vehicle, the steering angle to the right is increased and the vehicle is made to perform a right turn, and if it is displaced to the lefthand side of the vehicle taking the neutral position as a border, the steering angle to the left is increased and the vehicle is made to perform a left turn.

The engine control apparatus 64, the braking control apparatus 65, and the steering control apparatus 66 each have as a main component a microcomputer comprising a CPU, a ROM, a RAM, and the like, and they respectively perform programmed control of the throttle actuator 67, the brake actuator 68, and electric motor 69. These control apparatuses 64, 65, and 66 have a storage apparatus which receives signals from the electric control apparatus 50 and the like as inputs and temporarily stores them.

Figure 4:
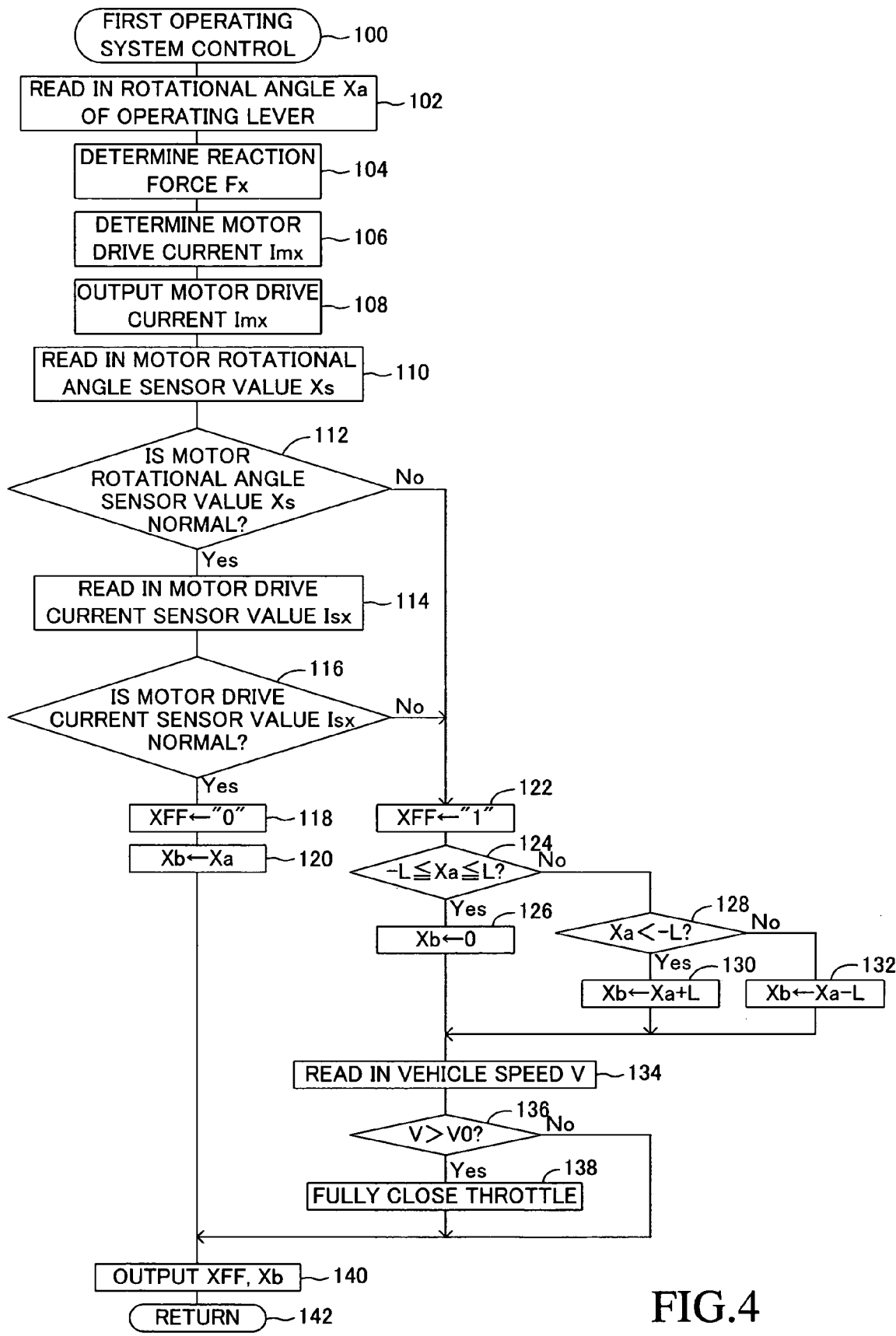
FIG. 4 is a flow chart showing a first operating system control (steering control) program executed by the electric control apparatus shown in FIG. 3.

Next, the operation of the embodiment constituted as described above will be explained while referring to the flow charts of FIGS. 4–8. FIG. 4 shows a first operating system control program executed by the CPU of the electric control apparatus 50 shown in FIG. 3. This program is stored in the ROM of the memory of the electric control apparatus 50. After the ignition switch is operated by the driver to be put into an on state, this program is repeated at prescribed short time intervals.

Execution of the first operating system control program begins from Step 100. When the driver operates the operating lever 10, in Step 102, the CPU of the electric control apparatus 50 reads in the rotational angle Xa, which is the displacement of the operating lever 10 which is sensed by displacement sensor 26. Namely, the electric control apparatus 50 input the rotational angle Xa, which is the displacement in the left and right directions of the operating lever 10 operated by the driver.

Figure 9:
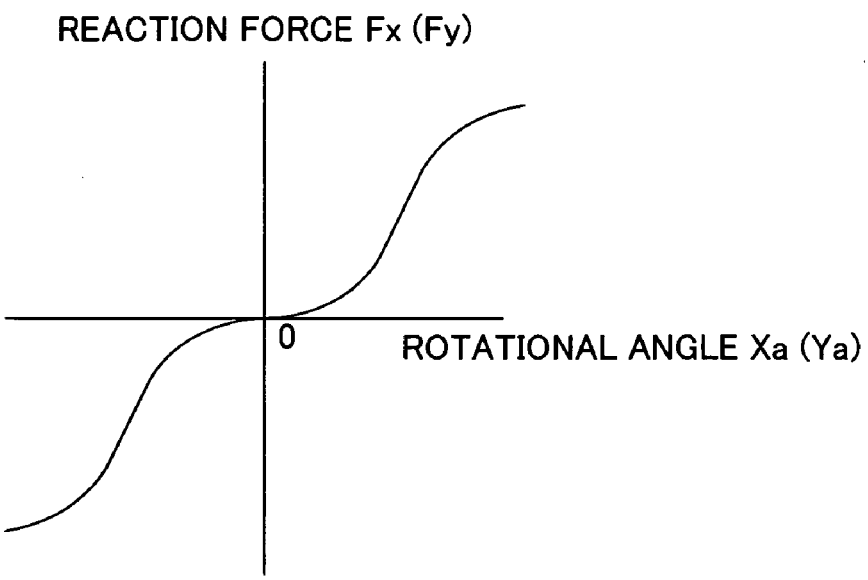
FIG. 9 is a map showing the relationship between rotational angle and reaction force.
Figure 10:
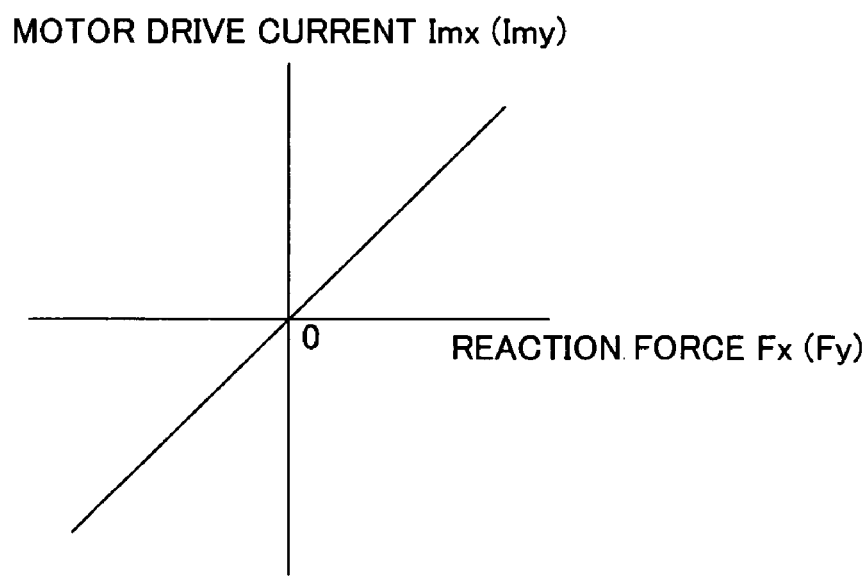
FIG. 10 is a map showing the relationship between reaction force and motor drive current.

Next, in Step 104, based on the rotational angle Xa, the reaction force Fx to be imparted to the operating lever 10 is determined. This reaction force Fx is found from a map of the rotational angle Xa and the reaction force Fx shown in FIG. 9. Next, in Step 106, the motor drive current Imx for driving electric motor 25 is determined. This motor drive current Imx is found from a map of the reaction force Fx and the motor drive current lmx shown in FIG. 10. The maps shown in FIG. 9 and FIG. 10 are previously created and stored in the ROM of the electric control apparatus 50.

Next, in Step 108, the electric control apparatus 50 outputs a control signal indicating the determined motor drive current Imx to drive circuit 61, and drive circuit 61 performs drive control of electric motor 25 in accordance with the control signal. As a result, drive control of electric motor 25 is performed drive control, and the left-right reaction force generating mechanism 20 generates a reaction force Fx opposing the operating lever 10 in accordance with the rotational angle Xa. Namely, drive circuit 61 performs drive control of electric motor 25 so as to generate a drive force tending to displace the operating lever 10 towards its initial position.

Next, in Steps 110 and 112, the program reads in the motor rotational angle sensor value Xs of electric motor 25 from encoder 27, it compares the value which is read in with the rotational angle Xa which was read in in Step 102, and it determines whether the motor rotational angle sensor value Xs is normal, or in other words, it determines whether electric motor 25 is operating normally. Then, in Steps 114 and 116, it reads in the motor drive current sensor value Isx of electric motor 25 from current sensor 28, and by comparing the read value with the motor drive current Imx which is determined in Step 106, it determines whether the motor drive current sensor value Isx is normal. In this manner, it investigates whether there is a broken wire or a short circuit or the like of drive circuit 61 and electric motor 25.

The processing of these Steps 110–116 is carried out in order to determine whether an abnormality of the left-right reaction force generating mechanism 20 has not taken place and whether it is generating a normal reaction force opposing the operating lever 10. Accordingly, this determination can be made not only on the basis of the motor rotational angle sensor value Xs which is detected by encoder 27 or the motor drive current sensor value Isx which is sensed by current sensor 28 but can also be made based on whether there is an abnormality in the sensed value which is sensed by displacement sensor 26 or based on whether there is a malfunction or the like of a mechanical part making up the left-right reaction force generating mechanism 20.

In Steps 112 and 116, if the motor rotational angle sensor value Xs and the motor drive current sensor value Isx are normal, a determination of Yes is made, and Step 118 is proceeded to, while if they are not normal in either step, a determination of No is made, and Step 122 is proceeded to. Here, there will be first described the case where the program proceeds to Step 118, because both the motor rotational angle sensor value Xs and the motor drive current sensor value Isx are normal; i.e., a failure of the left-right reaction force generating mechanism 20 has not occurred.

In Step 118, the reaction force failure flag XFF for the left-right directions is set to 0. If the reaction force failure flag XFF is 1, it indicates that a failure of the left-right reaction force generating mechanism 20 has occurred and that a reaction force corresponding to the displacement of the operating lever 10 when it is operated to the left and right is not applied to the operating lever 10, while 0 indicates other states. In the present situation, the reaction force opposing the operating lever 10 is generated in a normal manner, so the reaction force failure flag XFF is set to 0, and the program proceeds to Step 120.

In Step 120, the rotational angle indicating value Xb is set to the rotational angle Xa of the operating lever 10 which the electric control apparatus 50 received in the processing in Step 102. In a below-described steering control program which is executed by the steering control apparatus 66, the rotational angle indicating value Xb is used to calculate a target steering angle. In Step 140, after outputting the reaction force failure flag XFF and the rotational angle indicating value Xb, the program proceeds to Step 142 and temporarily ends. Subsequently, as long as a determination of Yes is made in Steps 112 and 116, the program repeatedly carries out the processing of Steps 100–120, 140, and 142.

Next, the case in which the reaction force opposing the operating lever 10 is generated in a normal manner in the steering control program which is carried out by the steering control apparatus 66 under the control of the electric control apparatus 50 will be explained with respect to FIG. 6. The execution of this steering control program begins with Step 300. In Step 302, the reaction force failure flag XFF which is output by the electric control apparatus 50 is read in. This reaction force failure flag XFF is set to 0 or 1 at the time of execution of the first operating system control program shown in FIG. 4. In the present instance, it was set to 0 by the processing of Step 118.

Next, in Step 304, the rotational angle indicating value Xb output by the electric control apparatus 50 is read in. This rotational angle indicating value Xb is set by the processing in Step 120 in the program shown in FIG. 4. When the reaction force failure flag XFF is set to 0, it is set to the value of the rotational angle Xa detected by displacement sensor 26.

Next, in Step 306, it is determined whether the reaction force failure flag XFF read in in Step 302 is 0. At this time, a failure of the left-right reaction force generating mechanism 20 is not occurring and a reaction force opposing the operating lever 10 is being generated in a normal manner, so at the time of execution of the program shown in FIG. 4, in Step 118, the reaction force failure flag XFF is set to 0. Accordingly, a determination of Yes is made, and Step 308 is proceeded to. The processing from Step 308 onwards will be explained.

In Step 308, a count value m for measuring the elapsed time from detection of a failure of the left-right reaction force generating mechanism 20 by encoder 27 or current sensor 28 is reset to 0. Then, in Step 310, a filter constant Ks is determined. The filter constant Ks is set to a value from 0 to 1 and its value is determined from the map shown in FIG. 11. In this case, the filter constant Ks is determined in accordance with the vehicle speed V based on the map for m=0 showing the case in which a reaction force failure has not occurred. Namely, as the vehicle speed V increases, the filter constant Ks increases along the map for m=0, and as the vehicle speed V decreases, it becomes smaller.

Next, in Step 328, a target steering angle Ts is determined based on the rotational angle indicating value Xb and the vehicle speed V. The target steering angle Ts is found from the map shown in FIG. 12. It is set so as to increase as the rotational angle indicating value Xb increases and to decrease as the rotational angle indicating value Xb decreases. In the relationship between the target steering angle Ts and the vehicle speed V, the target steering angle Ts is set so as to decrease as the vehicle speed V increases and to increase as the vehicle speed V decreases. Accordingly, when the vehicle is traveling at a high speed, vehicle operation is carried out with a small amount of steering input, and when the vehicle is traveling at a low speed, a large amount of steering input is required for vehicle operation.

Figure 12:
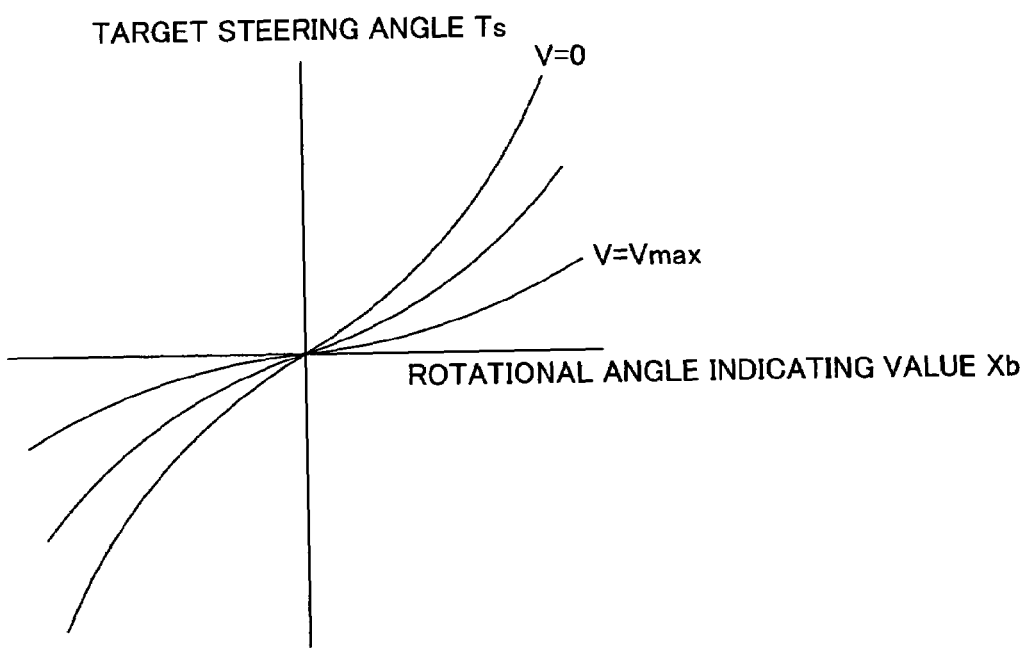
FIG. 12 is a map showing the relationship between a rotational angle and a target steering angle.

In the map shown in FIG. 12, in the vicinity of the reference position which is the crossing point between the horizontal axis showing the rotational angle indicating value Xb and the vertical axis showing the target steering angle Ts, a small dead band is provided with respect to steering of the vehicle, or in other words, in the direction of the horizontal axis in the vicinity of the reference position for each of the characteristic curves of the map in FIG. 12, a narrow horizontal portion is provided, and in a minute range of the rotational angle indicating value Xb, the target steering angle Ts is maintained at 0. Changing the width of this horizontal portion is equivalent to changing the width of the dead band of vehicle steering.

Then, in Step 330, the stored steering angle PTs showing the previous value of the target steering angle is set to the present value of the target steering angle Ts. Setting of the stored steering angle PTs is carried out in order to determine how much the present value of the target steering angle Ts has changed the next time the program is executed. Next, in Step 340, in order to control the responsiveness of vehicle steering to operation of the operating lever 10 to the left and right, the program performs low pass filter processing of the target steering angle Ts by performing the calculation shown by the following Equation 1.

$$Tsf \leftarrow Tsf + (Ts - Tsf) \times Ks \qquad \text{Equation 1}$$

In Equation 1, the variable Tsf indicates a low-pass-filter processed value of the target steering angle. The low-pass-filter processed value Tsf on the right side indicates the previous value of the low-pass-filter processed target steering angle Ts, and the low-pass-filter processed value Tsf on the left side indicates the present value of the low-pass-filter processed target steering angle Ts. As a result of this low-pass-filter processing calculation, the low-pass-filter processed value Tsf of the target steering angle Ts, which changes in responsiveness with filter constant Ks, is calculated. Namely, as a result of carrying out the calculation of Equation 1, if the filter constant Ks is a large value, a low-pass-filter processed value Tsf having good responsiveness with respect to the target steering angle Ts, i.e., with respect to the operation of the operating lever 10 is calculated. If the filter constant Ks is a small value, a low-pass-filter processed value Tsf having low sensitivity to the target steering angle Ts, i.e., to operation of the operating lever 10 is calculated.

In Step 342, the previous value of the rotational angle indicating value PXb is replaced by the current value of the rotational angle indicating value Xb. Replacement of the previous value of the rotational angle indicating value PXb is carried out in order to determine the speed of operation of the operating lever 10 at the time of the below-described processing. Then, the program proceeds to Step 344. In Step 344, the steering control apparatus 66 controls electric motor 69 so that the steering angle of the left and right wheels FW, FW becomes the target steering angle calculated value Tsf.

In this case, a failure of the left-right reaction force generating mechanism 20 has not occurred, so driving of electric motor 69 is carried out according to normal steering. Namely, the filter constant Ks is determined by the characteristic curve for m=0 in the map of FIG. 11, the responsiveness of vehicle steering control improves as the filter constant Ks increases, and the responsiveness of vehicle steering control is decreased as the filter constant Ks decreases. Therefore, in accordance with the characteristic curve for m=0, when the vehicle is traveling at a high speed, the responsiveness of steering control is decreased, and when it is traveling at a low speed, the responsiveness of steering control is increased. Then, the program proceeds to Step 346 and temporarily ends.

Next, returning to the first operating system control program shown in FIG. 4, the case will be explained in which a failure occurs in the left-right reaction force generating mechanism 20 and a reaction force opposing the operating lever 10 and corresponding to the displacement is no longer generated when the operating lever 10 is operated to the left and right. In this case, a determination of No is made in Step 112 or Step 116, Step 122 is proceeded to, and the processing from Step 122 is carried out. In this case, the warning lamp 63 is made to illuminate. As a result, the driver can recognize by the sensation in his hand grasping the operating lever 10 and by sight that a reaction force opposing the operating lever 10 is being abnormally generated.

In Step 122, the reaction force failure flag XFF for the left and right directions is set to 1. Then, in Step 124, it is determined whether the rotational angle Xa of the operating lever 10 is greater than or equal to the negative value of a constant L and less than or equal to the positive thereof. This constant L indicates the threshold value of a dead band (a region of play) of the operating angle of the operating lever 10 to the left and right. If the rotational angle Xa is greater than or equal to −L and less than or equal to L, it is determined that the operating lever 10 is positioned in a neutral state (the vehicle is traveling straight ahead). As stated earlier, when a failure of the left-right reaction force generating mechanism 20 has not occurred, this dead band is set to have a small width, and the vehicle does not react to operation of the operating lever 10 in the vicinity of the reference position. Here, the constant L is set so as to make this dead band even larger.

In this case, if the rotational angle Xa of the operating lever 10 is greater than or equal to −L and less than or equal to L, a determination of Yes is made and Step 126 is proceed to, while if the operating lever 10 is operated to the left or to the right outside of the dead band, a determination of No is made and Step 128 is proceeded to. Here, a determination of Yes is made and Step 126 is proceeded to. In Step 126, the rotational angle indicating value Xb is set to 0. Then, the program proceeds to Step 134.

In Step 134, a signal indicating the vehicle speed V is read in from the vehicle speed sensor 41. Then, in Step 136, it is determined whether the vehicle speed V is larger than a prescribed value V0. The prescribed value V0 for the vehicle speed V is a previously set value. It is set to at least the smallest value at which it can be determined that the vehicle is moving. Here, if the vehicle speed V is larger than the prescribed value V0 and the vehicle is moving at the prescribed speed or faster, a determination of Yes is made and Step 138 is proceeded to. In Step 138, by controlling the engine control apparatus 64, the electric control apparatus 50 drives the throttle actuator 67 and completely closes the throttle. As a result, the vehicle stops accelerating and continues to travel straight ahead while naturally decelerating or else stops.

After the program outputs the reaction force failure flag XFF and the rotational angle indicating value Xb in Step 140, it proceeds to Step 142 and ends. In Step 136, if the vehicle speed V is smaller than the prescribed value V0 and the speed of movement of the vehicle is less than or equal to the prescribed speed, a determination of No is made and Step 140 is proceeded to, and after the processing of Step 140, Step 142 is proceeded and the program ends. In this case, the vehicle continues to move straight ahead at the current speed of movement.

When a determination of No is made in the processing of Step 124 because the operating lever 10 has been operated to the left or right with the angle of operation exceeding the dead band, in Step 128, it is determined whether the rotational angle Xa of the operating lever 10 is smaller than −L. Here, if the rotational angle Xa is smaller than −L, namely, if the operating lever 10 is operated to the left outside of the dead band, a determination of Yes is made and Step 130 is proceeded to, and in Step 130, the rotational angle indicating value Xb is set to the sum of the rotational angle Xa and the constant L.

As a result, in the below-described steering control, the displacement of the operating lever 10 is regarded in such a manner that the operating lever 10 is located at a position closer to the neutral position than its actual position by the constant L, and the vehicle is steered based on that position. Therefore, the vehicle travels straight ahead or travels close to straight ahead while slightly turning left. Then, the program proceeds to Step 134, and after executing the processing of the previously described Steps 134–140, it proceeds to Step 142 and ends.

In the processing of Step 128, when it is determined that the rotational angle Xa is larger than −L, i.e., when the rotational angle Xa is larger than L and the operating lever 10 is being operated to the right beyond the dead band, in Step 132, the rotational angle indicating value Xb is set to the rotational angle Xa−L. As a result, in the below-described steering control, the displacement of the operating lever 10 is regarded in such a manner that the operating lever 10 is located at a position closer to the neutral position than the actual position by the constant L, and the vehicle is steered in accordance with that position. Therefore, the vehicle travels straight ahead or travels close to straight ahead while slightly turning to the right. Then, the program proceeds to Step 134, and after the processing of the above-described Steps 134–140, it proceeds to Step 142, and the program for the first operating system control (steering control) ends.

Next, returning to the steering control program of FIG. 6, the steering control program will be explained for the case in which a failure has occurred. Since a determination of No is made in the processing of Step 306 of the steering control program because the reaction force failure flag XFF is set to 1, the program proceeds to Step 312. The processing from Step 312 onwards for the case in which a failure has occurred in the left-right reaction force generating mechanism 20 is carried out. In this case, the rotational angle indicating value Xb read in Step 304 has been set to Xa+L, Xa−L, or 0 in accordance with the value of the rotational angle Xa which was detected by displacement sensor 26.

In Step 312, it is determined whether the count value m is equal to the count value M. As described below, when a failure of the left-right reaction force generating mechanism 20 occurs, the filter constant Ks becomes a small value and then increases with the passage of time. After a failure occurs, once the count value m reaches M, the filter constant Ks no longer increases. Namely, as shown by the map in FIG. 11, when the reaction force failure flag XFF is set to 0, the filter constant Ks is set according to the characteristic curve for m=0, and when the reaction forces failure flag XFF is set to 1 and the count value m is 1, it is determined in accordance with the characteristic curve for m=1. Then, with the passage of time, the value of the filter constant Ks increases, and when the count value reaches M, it is determined according to the characteristic curve for m=M.

The value of the filter constant Ks when the count value m reaches M becomes the maximum value for the period during which the reaction force failure flag XFF is set to 1. Accordingly, during the period when the reaction force failure flag XFF is set to 1 and the count value m is at most M, with the passage of time, the value of the filter constant Ks gradually moves from the characteristic curve for m=1 in the map towards the characteristic curve for which m=M, and it does not increase after the count value m reaches M. The filter constant Ks assumes the maximum value when m=0.

Unless the count value m is equal to the count value M, a determination of Yes is made and Step 314 is proceeded to, and the count value m is incremented by 1. Then, the program proceeds to Step 316. If a determination of No is made in Step 312 because the count value m is equal to the count value M, Step 316 is proceeded to without setting a new count value. Namely, when the count value has not reached M, the processing of Step 316 and onwards is repeated, and during this period, 1 is added to the count value m each time, and when the count value M is reached and thereafter, the filter constant Ks does not increase, so the count value m is not incremented.

In Step 316, it is determined whether the absolute value of the present rotational angle indicating value Xb minus the previous rotational angle indicating value PXb is smaller than the threshold value XG for the operating speed. The threshold value XG for the operating speed is a threshold value for determining whether the operating lever 10 is operating normally. If the speed of operation of the operating lever 10 exceeds this threshold value XG, a failure has occurred in the left-right reaction force generating mechanism 20 and the driver has inadvertently operated the operating lever 10 and reached that operating speed, so it is determined that the operation is not appropriate operation. If the operating speed of the operating lever 10 is less than or equal to the threshold value XG, a determination of Yes is made and Step 318 is proceeded to, and if it is greater than or equal to the threshold value XG, a determination of No is made and Step 332 is proceeded to.

Here, the processing from Step 318 and onwards will be explained for the case in which the operating speed of the operating lever 10 is less than or equal to the threshold value XG. If a determination of Yes is made in Step 316, the program proceeds to Step 318, and in Step 318, it is determined whether the operating speed lock flag SSRF is 0. A value of 1 for the operating speed lock flag SSRF indicates that the operating speed of the operating lever 10 is greater than the threshold value XG, and a value of 0 indicates other states. It is initially set to 0.

Here, the operating speed of the operating lever 10 is not greater than the threshold value XG, so the operating speed lock flag SSRF is set to 0. Accordingly, a determination of Yes is made, the program proceeds to Step 326, and in Step 326, determination of the filter constant Ks is carried out. The determination of the filter constant Ks is carried out based on the map shown in FIG. 11. In this case, it is determined based on the characteristic curve for m=1 and the vehicle speed V. Then, the program proceeds to Step 328, and in Step 328, the target steering angle Ts is determined based on the rotational angle indicating value Xb and the vehicle speed V. In this case, Xa+L, Xa−L, or 0 is used as the rotational angle indicating value Xb.

Then, in Step 330, the stored steering angle PTs indicating the previous target steering angle is updated with the value of the present target steering angle Ts, and in Step 340, low pass filter processing is performed on the target steering angle Ts, and the target steering angle calculated value Tsf is found. Next, in Step 342, the previous rotational angle indicating value PXb is updated with the present rotational angle indicating value Xb, and in Step 344, the steering control apparatus 66 controls electric motor 69 so that the steering angle of the left and right wheels FW, FW becomes the target steering angle calculated value Tsf. Then, the program proceeds to Step 346 and temporarily ends.

If a determination of No is made in Step 316 because the operating speed of the operating lever 10 becomes larger than the threshold value XG, Step 332 is proceeded to. In Step 332, the count value n is reset to 0. This count value n is for measuring the passage of time from the setting of the operating speed lock flag SSRF to 1. Then, in Step 334, the operating lock flag SSRF is set to 1.

Next, in Step 336, the target steering angle Ts is set to the value which was set as the previous stored steering angle PTs in Step 330 the previous time the program was executed. Namely, in the processing of Step 336, even if the driver operates the operating lever 10 and moves the operating lever 10, the operating speed is too fast compared to the normal operating speed, so it is determined that appropriate operation is not taking place, and control is carried out so as to maintain the target steering angle Ts at the value prior to the occurrence of a failure by the left-right reaction force generating mechanism 20. By this control, the steering angle of the left and right wheels FW, FW is maintained in the state prior to the occurrence of a failure regardless of the operating position of the operating lever 10.

Then, in Step 338, determination of the filter constant Ks is carried out. In this case, the filter constant Ks is set to a filter constant Kslock employed when the speed lock flag SSRF is set to 1. The value of the filter constant Kslock, which is previously determined, is set to a constant value regardless of the vehicle speed V. The filter constant Kslock is set to a smaller value than the value determined by the characteristic curve for m=1 in the map of FIG. 11. Then, the program proceeds to Step 340, the processing of the previously described Steps 340–346 is carried out based on the determined target steering angle Ts and the filter constant Kslock, and the program temporarily ends.

If a determination of No is made in the processing of Step 318 in the execution of the program after the passage of a prescribed length of time because the operating speed lock flag SSRF is set to 1, Step 320 is proceeded to, and the processing from Step 320 is carried out. In Step 320, the count value n is incremented by 1. Then, in Step 322, it is determined whether the count value n is equal to the count value N which corresponds to the passage of time at which to set the operating speed lock flag SSRF to 0.

When the operating speed of the operating lever 10 exceeds the threshold value XG, the operating speed lock flag SSRF is set to 1, and then, when the operating speed of the operating lever 10 becomes less than or equal to the threshold value XG, the operating speed lock flag SSRF is set to 0 after the passage of time corresponding to the count value N. Namely, after the driver inadvertently operates the operating lever 10 at a speed which exceeds the threshold value XG due to the occurrence of a failure in the left-right reaction force generating mechanism 20, if the operating speed of the operating lever 10 becomes less than or equal to the threshold value XG and a length of time corresponding to the count value N has passed from that time, it is determined that the effect from that operation has disappeared, so the operating speed lock flag SSRF is released and set to 0.

If a determination of No is made in Step 322 because the count value n has not reached the count value N and the count value n is different from the count value N, Step 336 is proceeded to. After the processing of the above-described Steps 336–346 is performed, the program ends. At this time, the steering angle of the left and right wheels FW, FW is maintained in the state prior to the occurrence of a failure. If a determination of Yes is made in Step 322 because the count value n has reached the count value N, Step 324 is proceeded to. In Step 324, the operating speed flag SSRF is set to 0. Then, Step 326 is proceeded to, and after the processing of the above-described Steps 326–330 and 340–346 is carried out, the program ends.

Figure 11:
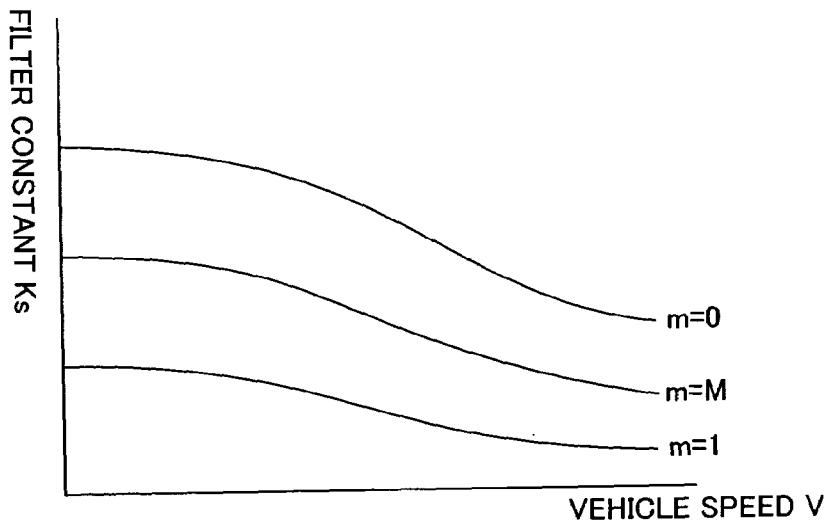
FIG. 11 is a map showing the relationship between vehicle speed and a filter constant for different count values.

Namely, in the processing from Step 322, from when the operating speed of the operating lever 10 becomes less than or equal to the threshold value XG until the count value reaches N, the filter constant Ks is set to Kslock, and after the count value reaches N, the filter constant Ks is set based on the map in FIG. 11.

In this manner, in steering control by this vehicle operating apparatus if a reaction force opposing the operating lever 10 is being generated in a normal manner, the vehicle is controlled so as to be steered according to the steering angle based on the rotational angle Xa of the operating lever 10, and if a failure occurs in the left-right reaction force generating mechanism 20 and a reaction force opposing the operating lever 10 is not generated in a normal manner, the dead band of the operating angle of the operating lever 10 is increased, and the vehicle is controlled so as to travel straight ahead or close thereto. At this time, if the vehicle speed V exceeds the prescribed value V0, the vehicle is decelerated. In this steering control, the width of the horizontal portion in the vicinity of the reference position for each characteristic curve of the map shown in FIG. 12 can be increased; and selective use of such modified characteristic curves of the map can replace the processing of Steps 128–132 in FIG. 4.

Next, the case will be explained in which a reaction force opposing the operating lever 10 is being generated in a normal manner in the second operating system control (acceleration and braking control) program shown in FIG. 5 which is executed by the electric control apparatus 50. In this second operating system control program, first, the same processing as in Steps 100–120, 140, and 142 of the above-described first operating system control program is carried out in Steps 200–220, 234, and 236 by replacing the displacement of the operating lever 10 with the rotational angle Ya of the operating lever 10 in the fore and aft directions, by replacing the reaction force opposing the operating lever 10 by the reaction force Fy opposing the operation of the operating lever 10 in the fore and aft directions, by replacing the motor drive current by the motor drive current Imy for driving electric motor 35, by replacing the motor rotational angle sensor value by the motor rotational angle sensor value Ys which is sensed by encoder 37, by replacing the motor drive current sensor value by the motor drive current sensor value Isy of electric motor 35 which is sensed by current sensor 38, and by replacing the reaction force failure flag by the reaction force failure flag YFF for the reaction force opposing the operation of the operating lever 10 in the fore and aft directions, in the corresponding portions of the flow chart of FIG. 4.

Figure 5:
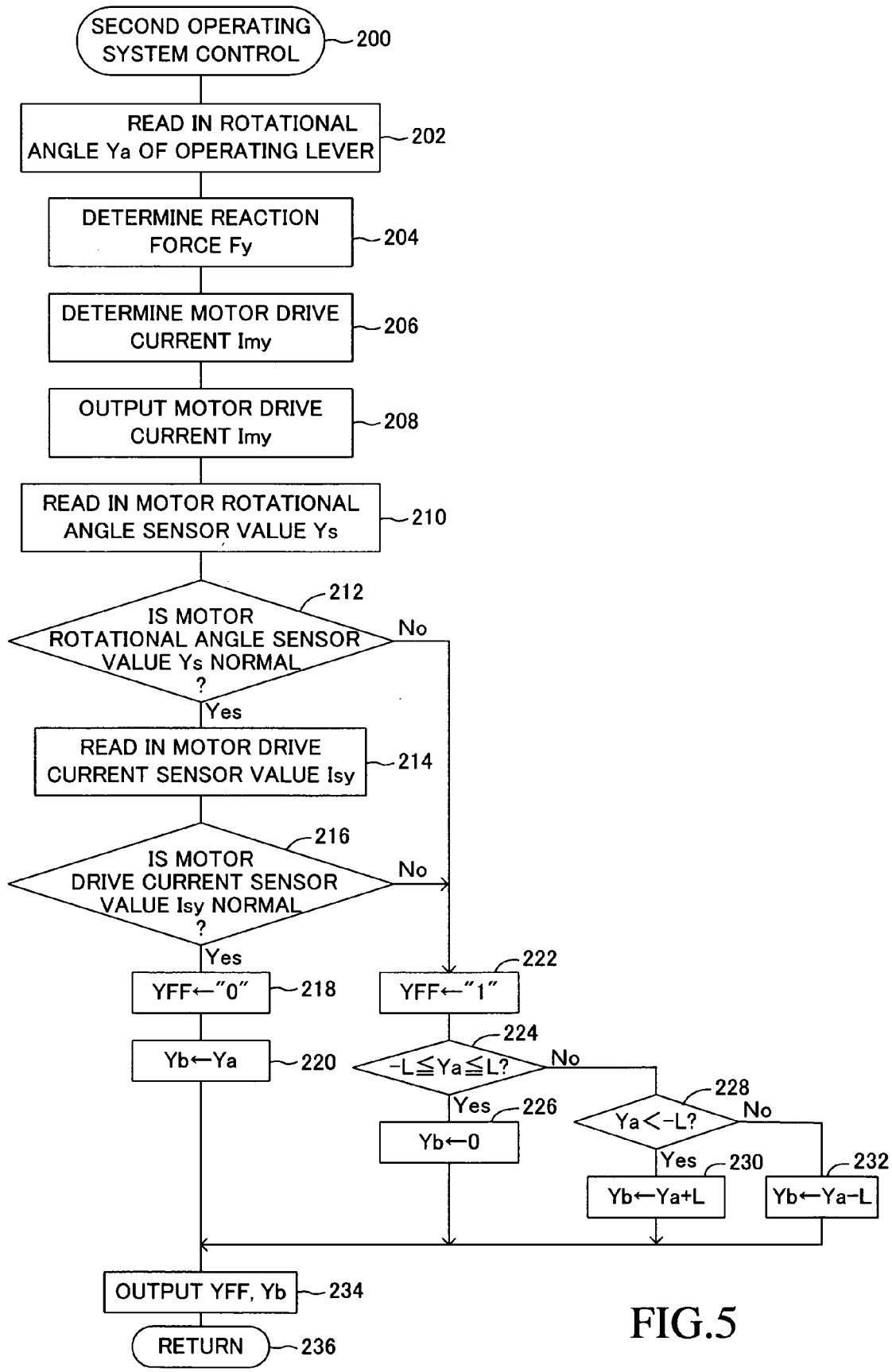
FIG. 5 is a flow chart showing a second operating system control (acceleration and braking control) program executed by the electric control apparatus shown in FIG. 3.

Namely, execution of the second operating system control program begins from Step 200 of FIG. 5. When the driver operates the operating lever 10, in Step 202, the CPU of the electric control apparatus 50 reads in the rotational angle Ya, which is the displacement in the fore and aft directions of the operating lever 10 which is sensed by displacement sensor 36. Then, in Steps 204 and 206, from the maps in FIGS. 9 and 10, the reaction force Fy to be applied to the operating lever 10 is determined based on the rotational angle Ya, and based on the reaction force Fy, the motor drive current Imy for driving electric motor 35 is determined.

Next, in Step 208, after the control signal which indicates the motor drive current Imy is output to drive circuit 62, in Step 210, the motor rotational angle sensor value Ys for electric motor 35 is read in from encoder 37, and in Step 212, it is determined whether this motor rotational angle sensor value Ys is normal. Then, in Step 214, the motor drive current sensor value Isy for electric motor 35 is read in from current sensor 38, and in Step 216, it is determined whether the motor drive current sensor value Isy is normal.

Next, in Step 218, after setting the reaction force failure flag YFF for the fore and aft directions to 0, in Step 220, the rotational angle indicating value Yb is set to the rotational angle Ya. Then, in Step 234, after the reaction force failure flag YFF and the rotational angle indicating value Xb are output, the program proceeds to Step 236 and temporarily ends. Subsequently, during the period in which a failure is not occurring in the fore and aft reaction force generating mechanism 30 and a reaction force opposing the operating lever 10 is being generated in a normal manner, the processing of Steps 200–220, 234, and 236 is repeated.

Next, while referring to FIG. 7, the case will be explained in which a reaction force opposing the operating lever 10 is being generated in a normal manner in the acceleration control program which is carried out by the engine control apparatus 64 under the control of the electric control apparatus 50. The execution of this acceleration control program starts from Step 400 of FIG. 7. In Step 402, the rotational angle indicating value Yb which is output by the electric control apparatus 50 is read in. This rotational angle indicating value Yb is set by the processing of Step 220 in the program shown in FIG. 5. In this case, it is set to the value Ya which is detected by displacement sensor 36.

Next, in Step 404, the value of the rotational angle indicating value Yb is set as a positive-side value of the rotational angle indicating value Yb, i.e., the rotational angle indicating value Yb1 towards the rear of the vehicle body (in the direction producing acceleration). Then, in Step 406, it is determined whether the rotational angle indicating value Yb1 is greater than or equal to 0, i.e., whether the operating lever 10 is being operated in the direction producing acceleration. If the operating lever 10 is being operated in the direction producing acceleration, a determination of Yes is made, and in Step 408, after the negative-side value of the rotational angle indicating value Yb, i.e., the rotational angle indicating value Yb2 towards the front of the vehicle body (in the direction producing braking) is set to 0, Step 412 is proceeded to. If the operating lever 10 is operated in the direction producing braking, a determination of No is made in Step 406, Step 410 is proceeded to, and after the rotational angle indicating value Yb1 is set to 0 in Step 410, Step 412 is proceeded to.

Namely, the processing of Steps 402–410 is carried out in order to calculate the target acceleration in Steps 412 and onwards when the operating lever 10 is in a position producing acceleration, and to set the initial value of the target acceleration to 0 when the operating lever 10 is in a position producing braking. Next, in Step 412, the reaction force failure flag YFF which is output by the electric control apparatus 50 is read in. The reaction force failure flag YFF is set to either 0 or 1 at the time of executing the second operating system control program shown in FIG. 5. In this case, it is set to 0.

Then, the program proceeds to Step 414, and the processing of Steps 414–418, 436, 438, and 448–454 is successively performed for the case in which the reaction force failure flag YFF is 0. From Step 414 onwards in this acceleration control program, approximately the same processing as in Steps 306–310, 328, 330, and 340–346 of the above-described steering control program is carried out in Steps 414–418, 436, 438, and 448–454 while replacing the reaction force failure flag XFF by the reaction force failure flag YFF, replacing the rotational angle indicating value Xb by the rotational angle indicating value Yb1 for the operating lever 10 towards the rear in the fore and aft directions, replacing the target steering angle Ts by the target acceleration Ta, and replacing the target steering angle calculated value Tsf by the target acceleration calculated value Taf in each of the corresponding parts of the flow chart of FIG. 6.

Namely, if a determination of Yes is made in Step 414 because a failure is not occurring in the fore and aft reaction force generating mechanism 30, in Step 416, the count value m is reset to 0. Subsequently, in Step 418, the filter constant Ks is determined, and in Step 436, the target acceleration Ta is determined based on the rotational angle indicating value Yb1. In this case, the filter constant Ks which is determined in Step 418 is found from the map shown in FIG. 13. Namely, the filter constant Ks in this case is determined in accordance with the passage of time regardless of the vehicle speed V, and in Step 418 in which a failure has not occurred in the fore and aft reaction force generating mechanism 30, the count value m is 0, and in this case, the filter constant Ks is a constant value shown by point a in FIG. 13.

Figure 14:
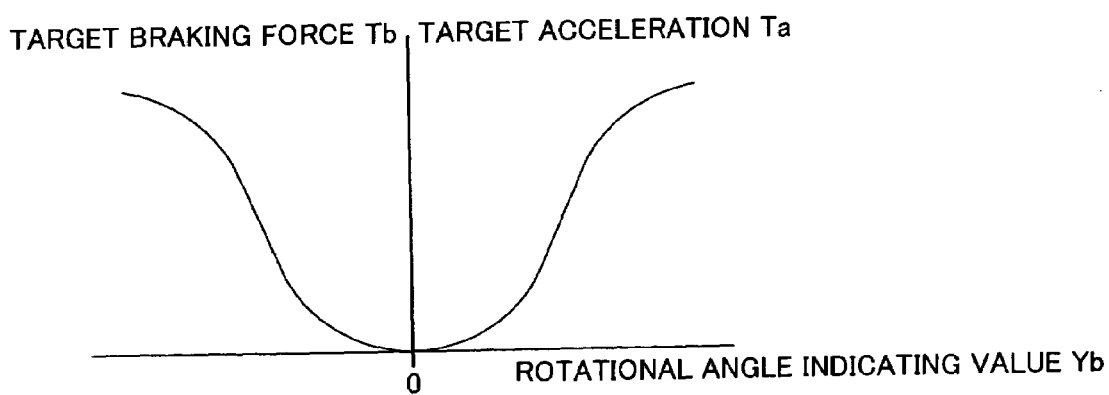
FIG. 14 is a map showing the relationship between rotational angle and a target acceleration and target braking force.

The target acceleration Ta which is determined in Step 436 is found using the positive side (acceleration side) of the map shown in FIG. 14. In the map of FIG. 14, the positive side of the horizontal axis showing the rotational angle Yb indicates acceleration, and the negative side indicates braking. Then, in Step 438, the stored acceleration PTa which indicates the previous target acceleration is updated with the present target acceleration Ta, and then in Step 448, the present target acceleration calculated value Taf which underwent low pass filter processing is calculated and updated.

Next, in Step 450, the previous rotation indicating value PYb1 is updated with the current rotation indicating value Yb1, and in Step 452, the throttle actuator 67 is controlled by the engine control apparatus 64 so that the acceleration becomes the target acceleration calculated value Taf. Then, the program proceeds to Step 454 and ends.

Next, while referring to FIG. 8, the case will be described in which a reaction force opposing the operating lever 10 is being generated in a normal manner in the braking control program which is carried out by the braking control apparatus 65 under the control of the electric control apparatus 50. Execution of this braking control program begins from Step 500 of FIG. 8. The braking control program is performed through execution of processing similar to that of the acceleration control program, with the rotational angle indicating value Yb1 in the acceleration control program shown in FIG. 7 being replaced with rotational angle indicating Yb2.

In this case, in Step 502, the rotational angle indicating value Yb which is output by the electric control apparatus 50 is read in. This rotational angle indicating value Yb is set to the value of Ya which is detected by displacement sensor 36. Then, in Step 504, the rotational angle indicating value Yb is set as a negative-side value of the rotational angle indicating value Yb, i.e., the rotational angle indicating value Yb2 in the forward direction of the vehicle body (the braking direction). Then, in Step 506, it is determined whether the value of the rotational angle indicating value Yb2 is less than or equal to 0, i.e., whether the operating lever 10 is being operated in the braking direction. If the operating lever 10 is being operated in the braking direction, a determination of Yes is made and Step 508 is proceeded to. In Step 508, after setting the rotational angle indicating value Yb1 in the aft direction (acceleration direction) to 0, Step 512 is proceeded to. If the operating lever 10 is being operated in the acceleration direction, a determination of No is made in Step 506, and after the rotational angle indicating value Yb2 is set to 0 in Step 510, Step 512 is proceeded to.

Next, in Step 512, the reaction force failure flag YFF which is output by the electric control apparatus 50 is read in, and then in Step 514, a determination of Yes is made since the reaction force failure flag YFF is 0. Then, the program proceeds to Step 516, and the processing of Steps 516–518, 536, 538, and 548–554 is sequentially carried out for the case in which the reaction force failure flag YFF is 0.

Figure 13:
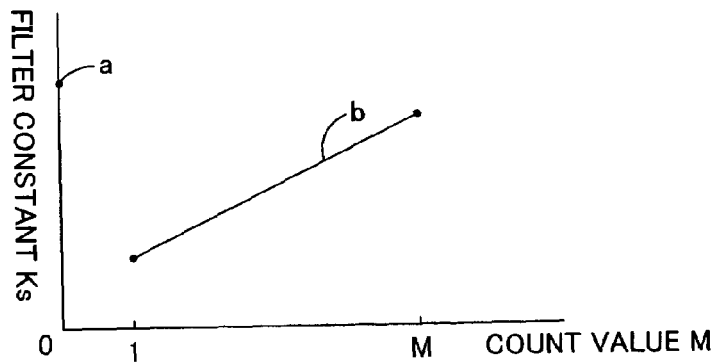
FIG. 13 is a map showing the relationship between a count value and a filter constant.

In this braking control program, the filter constant Ks which is determined in Step 518 is found from the map shown in FIG. 13 in the same manner as in acceleration control. Each of the other steps is carried out by performing processing similar to that of the corresponding steps in the acceleration control program, and in Step 552, the brake actuator 68 is controlled by the brake control apparatus 65 so that the braking force becomes the target braking force calculated value Tbf.

Next, in the execution of the second operating system control program of FIG. 5, the processing at the time of the occurrence of a failure in which a reaction force opposing the operating lever 10 and corresponding to displacement was not generated when the operating lever 10 was operated in the fore and aft directions will be explained. In this case, a determination of No is made in Step 212 or Step 216, and Step 222 is proceeded to, and then the processing of Steps 222–236 is carried out. In this case, the warning lamp 63 is illuminated.

In this processing at the time of the occurrence of a failure, in Step 222, after the fore and aft reaction force failure flag YFF is set to 1, in Step 224, it is determined whether the rotational angle Ya of the operating lever 10 is greater than or equal to the negative of a constant L and less than or equal to the positive value thereof. The constant L in this case is one which indicates a threshold value for the dead band of the operating angle of the operating lever 10 in the fore and aft directions. If the rotational angle Ya is at least −L and at most L, it is determined that the operating lever 10 is positioned in a neutral state (that the vehicle is traveling at a constant speed without accelerating or braking). In this case as well, setting of the constant L means that a small dead band which is set by the below-described acceleration and braking control is set to a larger value.

In this case, if the rotational angle Ya of the operating lever 10 is at least −L and at most L, in Step 226, the reaction force failure flag YFF and the rotational angle indicating value Yb are set to 0, and the rotational angle indicating value Yb is output in Step 234. Subsequently, the program ends in Step 236. When a determination of No is made in Step 224 and it is determined in Step 228 that the rotational angle Ya is smaller than −L, i.e., that the operating lever 10 is being operated forward beyond the dead band, in Step 230, the rotational angle indicating value Yb is set to the sum of the rotational angle Ya and the constant L. As a result, in the below-described braking control, displacement of the operating lever 10 is regarded in such a manner that the operating lever 10 is located at a position closer to the neutral position than the actual position by an amount corresponding to the constant L, and braking of the vehicle is carried out in accordance with that position. Therefore, the vehicle travels at a constant speed or approaches the constant speed while undergoing braking control.

If the rotational angle Ya is larger than −L, i.e., if the rotational angle Ya is larger than L and the operating lever 10 is being operated to the rear beyond the dead band, then in Step 232, the rotational angle indicating value Yb is set to the rotational angle Ya minus L. As a result, in the below-described acceleration control, the displacement of the operating lever 10 is regarded in such a manner that the operating lever 10 is located at a position closer to the neutral position than the actual position by an amount corresponding to the constant L, and the vehicle is accelerated in accordance with this position. Therefore, the vehicle travels at a constant speed or approaches the constant speed while undergoing acceleration control.

In the second operating system control program, acceleration and braking control are carried out based on the programs shown in FIG. 7 and FIG. 8, so the processing of Steps 134–138 of the first operating system control program shown in FIG. 4, i.e., processing for decelerating the vehicle is not carried out.

Returning to the acceleration control program of FIG. 7, the processing during the execution of the acceleration control program will be explained for the case in which a reaction force corresponding to the displacement of the operating lever 10 is no longer generated and a failure occurs when the operating lever 10 is operated in the fore or aft direction.

In this case, the program makes a determination of No in Step 414 and proceeds to Step 420, and then it successively performs the processing of Steps 420–454. In Step 420 and onwards in this acceleration control program, the threshold value XG for the operating speed of the operating lever 10 in FIG. 6 is replaced by threshold value YG in the corresponding portions of the flow chart of FIG. 6 and processing similar to Steps 312–346 of the above-described steering control program is performed in Steps 420–454.

In this case, the rotational angle indicating value Yb1 has been set to Ya+L or Ya−L. First, if a determination of No is made in Step 414 because a failure is occurring in the fore and aft reaction force generating mechanism 30, after the processing of Steps 420 and 422, in Step 424, it is determined whether the operating speed of the operating lever 10 in the fore and aft directions is less than or equal to the threshold value YG. If the operating speed in the fore and aft directions of the operating lever 10 is smaller than the threshold value YG, in Step 426, it is determined whether the operating speed lock flag SSRF is 0. If the operating speed lock flag SSRF is 1, the filter constant Ks is set in Step 434.

The filter constant Ks which is set in Step 434 is found using a portion of characteristic curve b of the map shown in FIG. 13. In this case, a failure is occurring in the fore and aft reaction force generating mechanism 30, and the count value m is in the range from 1 to M. That is, when the count value m is 1 immediately after encoder 37 or current sensor 38 detects a failure, the filter constant Ks becomes the smallest value of the portion shown by straight line b, and when a length of time has passed such that the count value m has become M, the filter constant Ks becomes the maximum value at the time of occurrence of a failure.

In Step 436, the target acceleration Ta is determined from the rotational angle indicating value Yb1 using the positive side (acceleration side) of the map shown in FIG. 14. In this case as well, the dead band can be increased by increasing the horizontal portion which extends along the horizontal axis in the vicinity of the reference position 0 in the map of FIG. 14. Therefore, selective use of such modified characteristic curves of the map can replace the processing of Steps 228–232 in FIG. 5.

Subsequently, the processing of Steps 438 and 448–454 is performed, the throttle actuator 67 is controlled by the engine apparatus 64 so that it becomes the target acceleration calculated value Taf at the time of occurrence of a failure, and then the program temporarily ends. If it is determined in Step 424 that the operating speed of the operating lever 10 in the fore and aft directions is greater than the threshold value YG, in Step 440, the count value n is set to 0, and in Step 442, the operating speed lock flag SSRF is set to 1. Then, after the processing of Step 444, in Step 446, the filter constant is set to Kslock, and then the processing from Step 448 is carried out.

In the case in which the operating speed of the operating lever 10 in the fore and aft directions exceeds the threshold value YG and then becomes less than or equal to the threshold value YG, if the count value n has not reached N, the filter constant is set to Kslock in Step 446, and when the count value n reaches N, the filter constant is set by the processing of Step 434 based on the map shown in FIG. 13. In each of the other steps as well, processing similar to that of the corresponding step of the steering control program is carried out, and in Step 452, the throttle actuator 67 is controlled by the engine control apparatus 64 so that the acceleration becomes the target acceleration calculated value Taf.

Next, returning to the braking control program of FIG. 8, braking control which is carried out by the brake control apparatus 65 under the control of the electric control apparatus 50 at the time of an occurrence of a failure will be explained. In this case, the program makes a determination of No in Step 514, and proceeds to Step 520, and then it successively performs the processing of Steps 520–554 for the case in which the reaction force failure flag YFF is set to 1.

In this braking control program, the filter constant Ks which is set in Steps 518 and 534 is found using the map shown in FIG. 13 in the same manner as in acceleration control, and the target braking force Tb which is set in Step 536 is found using the braking side, which is the negative side, of the map shown in FIG. 14. The other steps are carried out by processing like that of the corresponding steps in the acceleration control program, and in Step 554, the brake actuator 68 is controlled by the brake control apparatus 65 so that the braking force becomes the target braking force calculated value Tbf. Therefore, a detailed explanation will be omitted.

In the execution of the second operating system control program, if the reaction force opposing operation of the operating lever 10 in the fore and aft directions is being generated in a normal manner, the vehicle is controlled so as to perform acceleration and braking based on the rotational angle Ya of the operating lever 10, and if a failure develops in the fore and aft reaction force generating mechanism 30, the dead band for the operating angle of the operating lever 10 in the fore and aft directions is increased, and control is carried out so that the vehicle does not undergo sudden acceleration or braking.

In this manner, in a vehicle operating apparatus according to this embodiment, when a reaction force opposing the operating lever 10 is being generated in a normal manner, operating control of the vehicle is carried out in accordance with the displacement (rotational angle Xa, Ya) of the operating lever 10. If a failure occurs in the reaction force generating mechanisms 20, 30 which generate a reaction force opposing the operating lever 10, the filter constant Ks which is used to calculate the target steering angle calculated value Tsf, the target acceleration calculated value Taf, and the target deceleration calculated value Tbf is decreased, and responsiveness of vehicle control to displacement of the operating lever 10 is decreased. Therefore, during operation of the vehicle, the vehicle can continue to travel safely even if a reaction force opposing the operating lever 10 suddenly disappears and the amount of operation of the operating lever 10 by the driver increases.

In addition, the filter constant Ks which has been temporarily made a low value due to the occurrence of a failure is increased with the passage of time. Therefore, when the driver has become accustomed to the operation of the vehicle in the state in which a failure has occurred, the responsiveness of vehicle control to displacement of the operating lever 10 approaches the original normal state, and ease of operation of the vehicle improves. In addition, in the vehicle operating apparatus, when the reaction force generating mechanisms 20 and 30 undergo a failure, if the operating lever 10 is operated at a speed exceeding a prescribed speed, the steering angle, the acceleration, and the braking force are maintained at that of a state prior to the occurrence of a failure. As a result, abrupt steering is suppressed, and safety is maintained.

In addition, in this vehicle operating apparatus, when a failure develops in the reaction force generating mechanisms 20 and 30, the dead band for the operating angle of the operating lever 10 is broadened. As a result, the vehicle travels straight ahead or close thereto without making a sharp turn, and safety can be maintained. In this manner, with a vehicle operating apparatus according to the present invention, safe travel of a vehicle can be achieved by various types of control.

The invention claimed is:

1. A vehicle operating apparatus comprising:
an operating member operated by a driver;
a driving control means for controlling the driving of a vehicle in accordance with displacement of the operating member;
a reaction force generating means for generating a reaction force opposing the operating member in accordance with the displacement of the operating member;
a failure sensing means for sensing the occurrence of a failure in the reaction force generating means; and
a driving control responsiveness changing means for controlling the driving control means so as to decrease the responsiveness of driving control of the vehicle to displacement of the operating member when the failure sensing means senses a failure of the reaction force generating means.

2. A vehicle operating apparatus as set forth in claim 1, wherein the driving control responsiveness changing means changes the responsiveness of the driving control of the vehicle to displacement of the operating member in accordance with the passage of time after the failure sensing means senses a failure of the reaction force generating means.

3. A vehicle operating apparatus as set forth in claim 2, wherein the responsiveness of the driving control of the vehicle to displacement of the operating member is changed in accordance with the passage of time in such a manner that the responsiveness of driving control to operation of the operating member decreases immediately after the reaction force generating means senses a failure, and as time passes, the responsiveness approaches that of a state in which a failure has not occurred.

4. A vehicle operating apparatus comprising:
an operating member operated by a driver;
a driving control means for controlling the driving of a vehicle in accordance with displacement of the operating member from a reference position;
a reaction force generating means for generating a reaction force opposing the operating member in accordance with the displacement of the operating member;
a failure sensing means for sensing the occurrence of a failure in the reaction force generating means; and
a dead band changing means for controlling the driving control means so as to increase a dead band, which is provided in the vicinity of the reference position, of the displacement of the operating member with respect to the driving control by the driving control means when the failure sensing means senses a failure of the reaction force generating means.

5. A vehicle operating apparatus as set forth in claim 4, wherein when the displacement of the operating member exceeds the dead band, the driving control means performs driving control based on a value which is the displacement to which a prescribed correction value is added.

6. A vehicle operating apparatus as set forth in claim 5, wherein the correction value is a value which performs correction to decrease the displacement of the operating member.

7. A vehicle operating apparatus comprising:
an operating member operated by a driver;
a driving control means for controlling the driving of a vehicle in accordance with displacement of the operating member;
a reaction force generating means for generating a reaction force opposing the operating member in accordance with the displacement of the operating member;
a failure sensing means for sensing the occurrence of a failure in the reaction force generating means;
an operating speed sensing means for sensing the operating speed of the operating member; and
a driving control changing means for controlling the driving control means so as to change the driving control of the vehicle in accordance with the displacement of the operating member if the operating speed sensed by the operating speed sensing means is at least a prescribed value when the failure sensing means senses a failure of the reaction force generating means.

8. A vehicle operating apparatus as set forth in claim 7, wherein the driving control of the vehicle which is changed by the driving control changing means in such a manner that the steering angle of the vehicle is maintained at the value immediately before sensing of a failure for a prescribed length of time.

9. A vehicle operating apparatus comprising:
an operating member operated by a driver;

a driving control means for controlling the driving of a vehicle in accordance with displacement of the operating member;

a reaction force generating means for generating a reaction force opposing the operating member in accordance with the displacement of the operating member;

a failure sensing means for sensing the occurrence of a failure in the reaction force generating means; and a vehicle speed changing means for controlling the driving control means so as to reduce the speed of the vehicle when the failure sensing means senses a failure of the reaction force generating means.

10. A vehicle operating apparatus as set forth in claim 9, including a vehicle speed sensing means, wherein when the vehicle speed sensed by the vehicle speed sensing means is less than or equal to a prescribed value, the driving control apparatus controls the driving of the vehicle in accordance with the displacement of the operating member.

* * * * *